United States Patent [19]
Skala

[11] 3,911,284
[45] Oct. 7, 1975

[54] FUEL AND VEHICLE SYSTEM BASED ON LIQUID ALKALI METAL

[76] Inventor: Stephen F. Skala, 3839 S. Wenonah, Berwyn, Ill. 60402

[22] Filed: Apr. 2, 1974

[21] Appl. No.: 457,207

Related U.S. Application Data

[63] Continuation-in-part of Ser. No. 301,285, Oct. 27, 1972, abandoned.

[52] U.S. Cl. .................. 290/16; 290/50; 290/1; 136/86; 60/523; 318/139
[51] Int. Cl.² ........................................ B60L 11/12
[58] Field of Search ........... 318/139, 440; 290/1, 2, 290/16, 50; 136/86, 86 A; 60/517–523

[56] References Cited
UNITED STATES PATENTS

| | | | |
|---|---|---|---|
| 1,182,759 | 5/1916 | Emanuel | 136/86 A |
| 2,706,890 | 11/1974 | Schmidt | 60/523 |
| 2,921,110 | 1/1960 | Crowley et al. | 136/86 |
| 3,182,742 | 5/1965 | Dow | 180/14 |
| 3,247,406 | 4/1966 | Toesca | 290/1 |
| 3,296,449 | 1/1967 | Plust et al. | 290/2 |
| 3,336,162 | 8/1967 | Zachmani | 136/86 A |
| 3,353,349 | 11/1962 | Percival | 60/523 |
| 3,421,994 | 1/1969 | Leduc | 136/86 A |

*Primary Examiner*—G. R. Simmons
*Attorney, Agent, or Firm*—Dominik, Knechtel, Godula & Demeur

[57] ABSTRACT

A sodium and potassium liquid fuel alloy is used for operating a motor generator by reaction with water to obtain energy and form hydrogen gas. Said motor generator converts the chemical energy from the heat of reaction to electrical or mechanical energy. The spent alkali hydroxides formed from the reaction are stored for subsequent regeneration to the starting sodium potassium fuel. Hydrogen gas formed in the alkali metal-water reaction is delivered along with air to a second generator which converts the chemical energy to electrical or mechanical energy.

23 Claims, 4 Drawing Figures

FUEL AND VEHICLE SYSTEM BASED ON LIQUID ALKALI METAL

This application is a continuation-in-part of Ser. No. 301,285, filed Oct. 27, 1972 by the same applicant, now abandoned.

This invention relates to utilizing a sodium and potassium alloy liquid fuel for operating a motor generator which can operate a storage battery for operating an electrically powered vehicle. In particular, the invention relates to a system wherein spent alkali hydroxides formed from the reaction of the sodium potassium fuel and water are returned to a regenerating zone so that sodium potassium fuel can be collected to again be delivered to the motor generator. A method for employing such fuel and system is also part of the invention, as well as an electrically powered vehicle operable in accordance with the method and the system.

The petroleum system operating internal combustion engines or the like has been universally applied, studied and utilized. The system, however, has been recognized as having certain serious defects. Such defects include the exhaustible nature of the petroleum resources, the pollutant problems of gasoline combustion engines, including hydrocarbon emissions formed at lower temperatures while nitrogen oxide pollutants are formed at lower temperatures while nitrogen oxide pollutants are formed at higher temperatures. Attempts to combat this pollutants problem have involved the design and use of control devices which are expensive, unreliable, and diminish performance of the internal combustion engine.

Attention has recently been directed to other fuel sources, including hydrogen. Hydrogen is a versatile fuel which can power external and internal combustion engines and fuel cells. The use of hydrogen to power a vehicle engine involves problems such as the hazards of storing hydrogen as such a fuel source. The problem can, in part, be overcome by generating hydrogen as needed from more stable substances, such as decomposition of metal hydrides in water, and oxidation of metals by water. The solid, heavy substances, however, do not have the handling conveniences which are desirable for a fuel source.

Another alternative to a petroleum fuel system which has received great attention is a rechargeable battery to operate electrically powered vehicles. Electrical power is economical but recharging time can be inconveniently long and energy capacities can be disadvantageously low. Replaceable electrodes may overcome the problem of recharging and convenience of bulk liquid is partly approached by utilizing certain powdered zinc-electrolyte slurries. Such means, however, are limited to particular kinds of batteries.

It is therefore a general object of the present invention to provide a system, method and apparatus which utilizes to greater advantage a sodium potassium liquid fuel system for operating a motor generator which is characterized by advantages of economy and clean operation relative to the operation of a petroleum fuel in an internal combustion engine.

Another related object of the invention is the use of a sodium and potassium liquid fuel to operate motor generating means so that the energy generated thereby may be utilized in a variety of ways in an improved manner.

Still another related object is an operating system which delivers sodium and potassium fuel to an apparatus such as a vehicle so that said fuel can be reacted in a chamber of a motor generator means, and whereby the spent products of reaction can be returned to a regenerating zone separate from the apparatus to convert the alkali hydroxide products to sodium and potassium fuel, as well as water which is used in the reaction chamber.

Still another related object is the provision of a sodium and potassium liquid fuel which undergoes reaction with water in a chamber with motor generator means, and which is characterized by formation of non-polluting products which are recycled for regeneration to again obtain the fuel and water.

Yet still another related object is the provision of a sodium potassium fuel which is handled in an advantageous manner as a bulk liquid with respect to regenerating means and storage means prior to combustion in a motor generator.

It is yet still another related object to provide an electrically powered vehicle in which a conventional storage battery is rechargeable by electric energy developed from energy of reaction of sodium and potassium liquid fuel with water and such energy utilization is characterized by the improvements of further reacting hydrogen reaction product with oxygen in an associated fuel cell.

Still yet another object is a system and method which is operable in an electrically powered vehicle wherein a sodium and potassium liquid fuel is utilized in versatile ways with different vehicle power plants.

Yet another related object is the incorporation of conventional electrical power sources to regenerate spent products of alkali fuel reaction in a zone separate from a power plant operation so that regenerated fuel and water can be stored for redelivery to the power plant, and in which the conventional electric power may also be used to operate a battery charger in the system for recharging a conventional storage battery, which itself is chargeable by electric energy developed from the fuel system combustion.

A particularly related object is an electrically powered vehicle, which uses a conventional storage battery for driving power, and which storage battery is recharged selectively by electrical energy developed from conversion of chemical energy resulting from reaction of sodium and potassium liquid fuel with water in a combustion chamber, as well as utilizing still other means for charging the storage battery to operate the electrically powered vehicle.

The foregoing objects are now attained together with still other objects which will occur to practitioners from time to time as they consider the invention in the following disclosure which includes drawings wherein.

Figure 1:
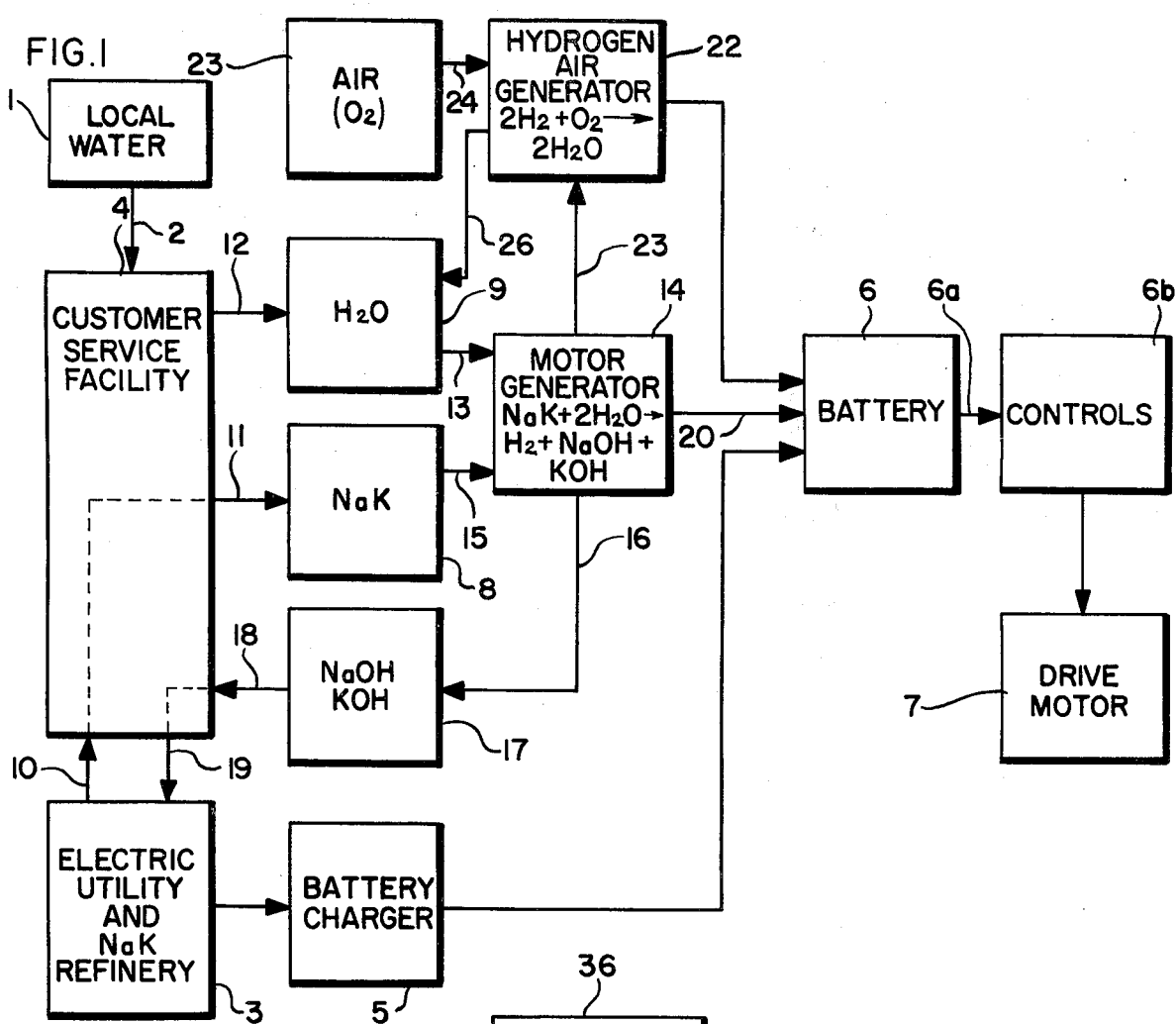
FIG. 1 is a block diagram illustrating the operation of the system in association with an electrically powered vehicle.

The present invention utilizes the chemical energy known to be generated by reacting an alkali such as sodium or potassium with water. Such reaction produces energy, a spent alkali hydroxide, and hydrogen gas in accordance with the following equation:

$Na + H_2O \rightarrow NaOH + \tfrac{1}{2}H_2 + 3520$ BTU per lb. Na.

In part, the present invention also utilizes the energy obtained by the oxidation of the hydrogen formed in the foregoing equation in accordance with the following equation:

$\tfrac{1}{2}H_2 + 1/4O_2 \rightarrow \tfrac{1}{2}H_2O + 2500$ BTU per lb. Na.

The oxidation of the hydrogen is a reaction characteristic is a reaction characteristic also of hydrogen-oxygen electrode fuel cells, wherein the energy is delivered as electrical energy. Both forms of energy are utilized to advantage from the sodium and potassium alloy liquid fuel used in the invention. Such fuel has a particular advantage in that it is present as a liquid which melts at 10°F. and is therefore in a liquid form at most temperatures except substantially subfreezing. Reference may be made to U.S. Pat. No. 3,173,783. The liquid fuel alloy is composed of about 23% sodium and 77% potassium, identified herein also as NaK. Not only can this alloy be handled as a liquid, but also the spent alkali hydroxides which are formed following reaction of the alloy with water.

The invention provides that NaK and water is conveyed to a reaction chamber of a motor assembly where the chemical energy is preferably converted into electrical energy for charging a storage battery. The liquid spent hydroxides are then removed to a regenerating zone where a primary source of electric power is used to regenerate the hydroxides by electrolysis to NaK. The regnerated fuel is then available to be returned to the motor generator.

The heat of reaction of NaK is about 4,500 BTU per lb., whereas the heat of combustion of gasoline is about 20,000 BTU per lb. The efficiency of gasoline, however, is limited by the themodynamics of combustion engines, and is further decreased by pollution reduction control devices. The value of fuel is most realistically assessed by considering its total cost per mile of driving comparable vehicles. NaK can use more efficient cycles and is non-polluting.

The NaK liquid fuel may be processed in a wide variety of energy-converting devices, which may include nuclear or fossil fuels which convert mechanical energy by generator means to electrical energy. Such electrical energy is used to regenerate spent alkali hydroxides by electrolysis. In this sense, the NaK liquid fuel may be considered as a secondary energy source used in the motor generator. The chemical energy potential of NaK is released upon reaction with water to provide mechanical energy to motor generators, so that the mechanical energy can be converted to electrical energy.

It is another advantage of the invention that movement of NaK liquid fuel through pipelines may operate as an electrical transmission line because NaK is a good electrical conductor. This becomes useful in applications where the regenerated NaK is redelivered from a regenerating zone to a motor generator through an intermediate storage stop. Such lines can carry electrical energy as a supplemental electrical energy form to a storage battery, for example.

Referring now to the drawings a local water source 1 provides water by line 2 to a customer facility 4. A regenerating zone 3 is collectively shown as including a primary electrical power source which regenerates spent alkali hydroxides to obtain the NaK liquid fuel, such fuel along with locally obtained water being stored in the service facility 4. The primary source of electric power 3 also provides electricity to a battery charger 5 which, in turn, may be used to charge storage battery 6 for electrically powering the drive motor and controls 7 of an electrically powered vehicle.

In an operating system, the customer service facility 4 and the electric utility and refinery 3 are separate from the power plant operation otherwise shown. The customer service facility 4 may be used as a retail source to an electrically powered vehicle which receives the regenerated NaK liquid fuel in a fuel reservoir or tank 8; and which receives the water from the facility 4 in another water reservoir or tank 9. Conventional lines are used throughout the system such as a conduit line 10 connecting the regenerated NaK and water to the customer service facility 4, line 11 for returning the NaK to the NaK tank, and line 12 for returning the water to the water tank.

The water from tank 9 is conveyed by line 13 to motor generator means 14, and the NaK is also conveyed from tank 8 by line 15 to the motor generator means 14. Thermal energy is then obtained by the reaction of NaK and water with the atendant production of hydrogen gas and spent alkali hydroxides. The alkali hydroxides are transferred by line 16 to spent hydroxide collector 17 where they are then removed by line 18 to the customer service facility 4 for storage, and eventual transmission to refinery 3 by line 19.

In the preferred form, described later in greater detail, the chemical energy is converted to electrical energy in a motor generator 14, and such electrical energy is connected to the storage battery 6 via line 20, and the storage battery connects through conductor 6a to controls 6b to electrically operate the drive motor 7 and the vehicle.

Additional energy is obtained by routing the hydrogen formed at the motor generator zone 14 to a fuel cell means 22 via line 23. This is a conventional fuel cell having hydrogen and oxygen preferably obtained from an air compressor 23 and delivered to the fuel cell via line 24. The electric current is then transmitted through an electric line which is similar to line 20 and similar to the line leading from battery charger 5, all such lines leading to storage battery 6. It is understood that hydrogen itself could fuel an internal combustion engine in place of being routed to fuel cell 2. This is not the preferred embodiment since the compression phase of the Carnot cycle would reduce efficiency of operation. The water formed in the fuel cell 22 is transmitted by line 26 to the water reservoir or tank 9 for recycling to the motor generator 14.

Although not shown, the vehicle may be a modular hybrid addition to generator 14, where NaK liquid fuel or battery charging facilities are not available. In general operation, conventional storage battery 6, such as lead-acid or other rechargeable kinds, can be said to provide power to the vehicle during peak demand, such as acceleration, high speed driving, and when the power input associated with the liquid fuel are not functioning. In this way, the motor generator can be set for normal continuous operation, rather than peak operating conditions to thereby retain high performance characteristics. Although such means are also not shown, a regenerative braking system can be employed to return electrical power to battery 6. The drive motor 7 can be of conventional AC or DC design. It is also intended that electromagnetic pumps can be used with the liquid metal NaK fuel, such fuel being delivered from tank 8 and through hydraulic motors such as turbines, which drive the wheels of the vehicle.

It will be appreciated that operation of the vehicle in accordance with the system illustrated will require heating of components at temperatures below the freezing point of the NaK liquid fuel. Reference may be made to U.S. Pat. No. 3,067,841. Such sources of heating energy are represented by batteries, or the heat may be obtained from the reaction of the NaK fuel with water, or preferably, storing heated NaK liquid fuel in an insulated sump. Such thermal storage is adequate for several days of frigid weather and sufficient for immediate comfort heating. It is also intended that a dual purpose transmission line can be provided in a system since the NaK fuel is both a mobile fluid and a good electrical conductor. A preferred embodiment would include three phase electric current, and a fourth tube for the return path of the spent hydroxides. These transmission lines can be suspended from towers or installed underground. Line cross-section can be sufficiently large to permit convenient voltages without excessive resistive power loss. Normal heating associated with such lines would permit pipelining in frigid weather. In this sense, the NaK liquid fuel finds use as a general purpose fuel with such applications as home heating, or home electric power generation.

Figure 2:
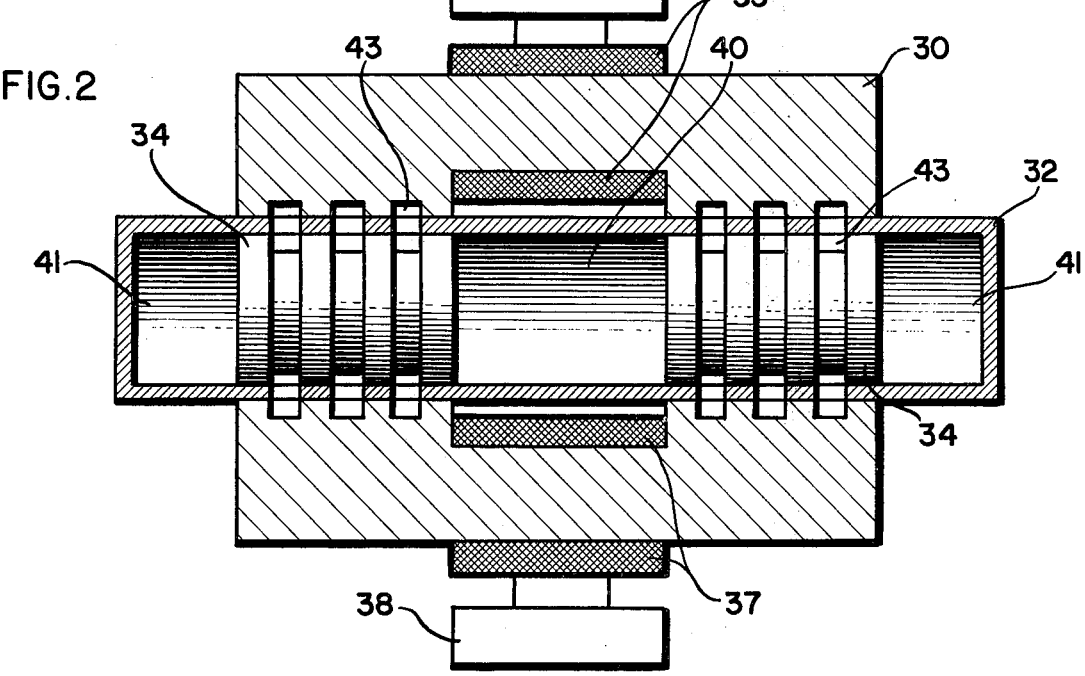
FIG. 2 is a highly diagrammatic view, mostly in section, of a representative embodiment of the motor generator using the system depicted in the view of FIG. 1.

One embodiment of the motor generator means is shown in greater detail in the schematic view of FIG. 2. The motor generator shown conforms to a variable reluctance free piston type. Such types of motor generator are generally disclosed in teachings such as U.S. Pat. Nos. 2,992,342 and 3,247,406. Such a motor generator preferably includes an electromagnet body or element 30 preferably made of laminated magnetically soft iron. A central passageway of the magnetic element receives an elongated cylinder 32 containing a pair of reciprocating pistons 34. A DC field excitation coil 35 encircles the magnetic element 30, and such coil is shown connected to a power source 36 so that the current creates magnetic flux. Armature coil 37 is also provided for converting the magnetic energy into electrical energy following reciprocation of the piston elements. Coil 37 is connected to its associated load, such as battery 6.

The NaK liquid fuel and water are injected by means (not shown) and combustion chamber 40 between the reciprocating pistons, and the energy of the chemical reaction forces the pistons towards the opposite ends of the cylinder 32. This motion compresses and traps the air 41 between the opposite ends and the respective pistons. As the pistons approach their maximum outward position, a valve (not shown) opens and exhaust reaction chamber 40, and compressed air 41 and the magnetic field forces drive the pistons inward. The position of the pistons shown in the view of FIG. 2 may be considered as an equilibrium point. As the pistons continue to move inwardly to reduce the volume of the combustion chamber 40, the forces reverse which arise from the combustion chamber 40, the forces reverse which arise from the entrapped air and the magnetic field. The electrical energy transferred to load 38 is restored to the pistons 34 by a succeeding injection of NaK liquid fuel and water into the combustion chamber 40 to sustain the oscillatory movement of the pistons. The pistons 34 and the magnet element 30 are shown with a plurality of air gaps which result in several reversals of the magnetic field for each stroke of the pistons, thereby increasing the output frequency and reducing the mass requirement of the magnet element 30. As an alternative practice, oxygen could be introduced into reaction chamber 40 so that the hydrogen formed during a reaction would undergo combustion. The cycle would then be similar to that of a diesel, but efficiency of operation would be lower than simply introducing the NaK liquid fuel and water by injection. Such injection in preferably conducted with the help of a small orifice so that the NaK liquid forms small droplets which immediately contact injected water for exothermic reaction. Such reaction continues in the presence of the hot water vapor which forms from the heat of reaction.

Figure 3:
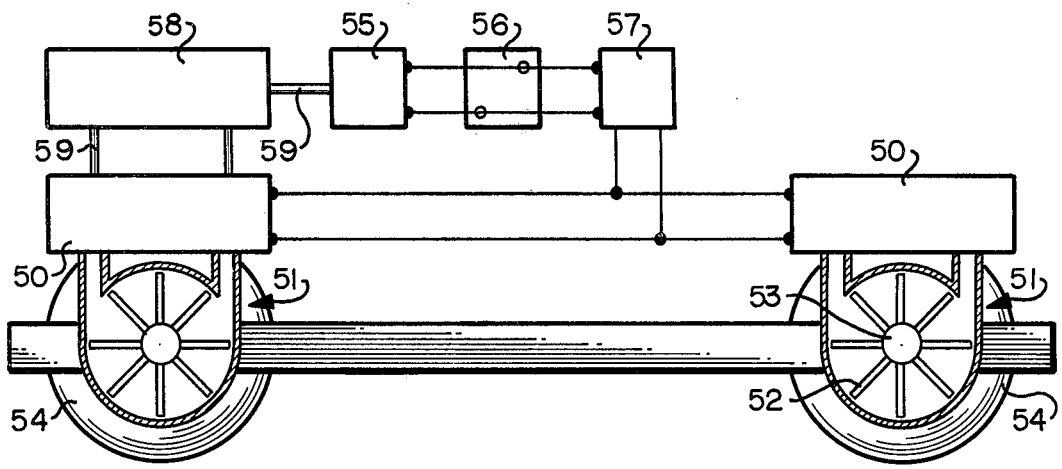
FIG. 3 is a highly schematic representation of a vehicle operated by a hydraulic motor combined with an electromagnetic pump.

The view of FIG. 3 utilizes features of driving an electromagnetic pump by a hydraulic motor, such a general arrangement being shown, for example, by P. Burnier in U.S. Pat. No. 3,585,422. An electromagnetic pump 50 urges NaK to flow to hydraulic motor 51. The electromagnetic pump generates forces following flow of an electric current from a source of electric power through magnetic portions of the electromagnetic pump. Such forces urge the flow of Nak against vanes 52 in the hydraulic motor. The vanes are connected to a shaft 53 which drives wheel 54. A motor generator 55 and a battery 56 are connected to a controller 57 which regulates electrical power output to the electromagnetic pump 50. A source or reservoir of NaK, shown as tank 58, provides NaK to the motor-generator assembly and to one or more electromagnetic pumps by way of conduit 59.

Figure 4:
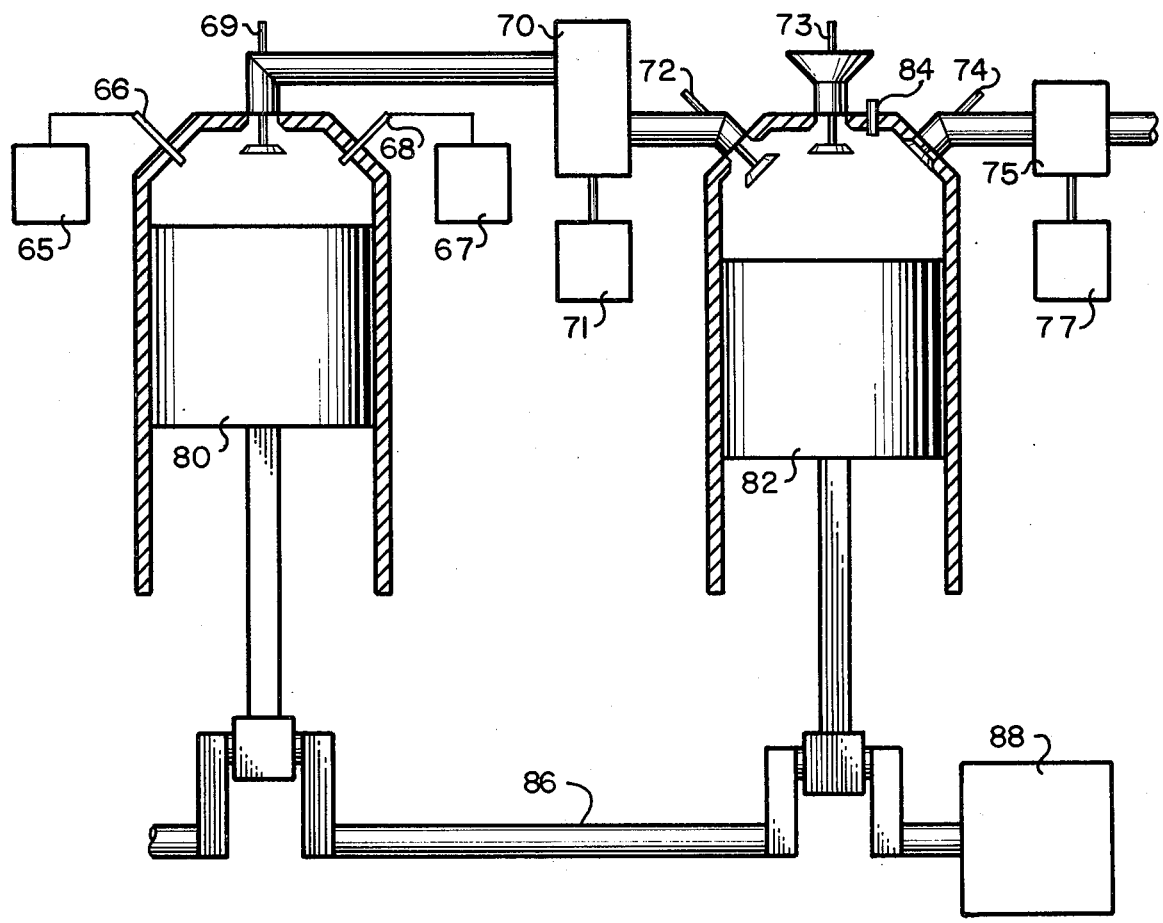
FIG. 4 is a highly schematic view of parts of an internal combustion engine utilizing a NaK and water reaction followed by a hydrogen and air reaction.

The view of FIG. 4 illustrates an internal combustion engine utilizing a NaK-water reaction followed by a hydrogen-air reaction. A NaK tank 65 is joined by conveying means to a NaK injector 66 which delivers NaK into the chamber of the combustion cylinder. A source or tank of water 67 is joined by conveying means to another injector 68 which also delivers water into the chamber of the combustion cylinder. The hydrogen and hydroxides of NaK are formed as reaction products in the reaction chamber, and such products move through valve 69 along conveying means into separator 70. The hydroxide reaction products are conveyed for storage in tank 71, and the hydrogen is conveyed for passage through valve 72 into the chamber of an adjoining combustion cylinder. Air is introduced into the combustion chamber of the adjoining cylinder through valve 73. The hydrogen-air reaction results in energy and the production of nitrogen and water combustion products. The nitrogen is discharged by way of valve 74, and the water is conveyed to collector 75 where it is condensed and then moved to water tank 77.

In operation, piston 80 approaches the top of its stroke in the first cylinder, whereupon valve 69 closes and injectors 66 and 68 operate to introduce NaK and water into the combustion chamber. The formed hydrogen drives piston 80 downwardly, and thereafter the hydrogen is exhausted on the upstroke through open valve 69 for storage in separator 70. Piston 82 in the adjoining cylinder draws in hydrogen and air on the downward stroke, and compresses the mixture on the upstroke. The mixture of hydrogen and air is ignited by sparkplug 84 and the energy of combustion drives the piston 82 downwardly. The water and nitrogen combustion products are exhausted through open valve 74 on the upstroke of the piston. The operating cylinders turn crank 86 which is joined to load 88, preferably an electrical generator.

Other vehicle power plants are within the scope of this invention. An advantage of a NaK fuel system is the wide variety of energy conversion means which can provide optimum parameters for particular applications. The following are representative examples.

The direct conversion to electrical power by cells having NaK-air electrodes, using a non-aqueous electrolyte. Other electrodes may be used instead of air.

The external reaction of NaK engines generating hydrogen with water as a gas at high temperatures and pressures. Turbine, piston, or rotary engines can convert thermal energy of the gas to kinetic energy. The chemical energy of the hydrogen gas is further converted to useable energy by means such as discussed previously. Kinetic energy may drive the vehicle directly or be first converted to electrical energy as discussed previously. The reaction means may include a circulating pool of hot NaK with water vapor or droplets impinging on its surface. Hydroxides are removed during circulation, while gas expands into the engine. Alternatively, NaK droplets can impinge upon a wet surface.

Another external reaction engine generates heat at substantially normal pressure. The heat powers an expansion engine such as a Stirling kind. Internal reaction engines similar to conventional internal combustion engines, such as turbine, piston, or rotary engines, may be based on a water NaK reaction as previously described.

The claims of the invention are now presented, and terms used in such claims may be further understood by reference to the language of the preceding specification and the views of the preceding drawings.

What is claimed is:

1. A sodium and potassium liquid fuel system, including
   a power plant having a sodium potassium fuel reservoir, a motor generator with a combustion chamber, a water reservoir, a spent alkali hydroxide collector, means to convey the fuel and water to the motor generator, and means to transfer the spent hydroxides to said collector,
   a regenerating station separate from said power plant and having a refinery for the spent alkali hydroxides, an electric power source operating said refinery to regenerate the spent alkali hydroxides to sodium potassium fuel and a service facility to store the regenerated fuel together with water,
   connectable removing means between the collector and service facility and the refinery so that the spent hydroxides may be received in the refinery, and
   connectable return means between the service facility and the reservoirs so that the fuel and water may be returned to the reservoirs.

2. A system which includes the features of claim 1 above, which further includes a storage battery, fuel cell means having hydrogen and air electrodes, means to route the formed hydrogen product from the motor generator to the fuel cell means and means to deliver oxygen to said fuel cell means for reaction with the hydrogen to obtain electrical energy for said storage battery.

3. A system which includes the features of claim 2 above and which further includes a power output operated by said storage battery.

4. A system which includes the features of claim 2 above, wherein said regenerating means include a source of primary electric power to regenerate said spent hydroxides by electrolysis and which further includes battery charging means operated by said electric power, and means joining said charger to said storage battery.

5. A system which includes the features of claim 4 above, wherein said power output is a vehicle drive motor of an electrically operated vehicle.

6. A system for operating a vehicle which includes the features of claim 5 above, wherein the connectable return means of said service facility operates to charge fuel and water reservoirs carried by said vehicle.

7. A system which includes the features of claim 6 above, which further includes compressor means to deliver air as the source of said oxygen to said fuel cell means.

8. A system which includes the features of claim 1 above, wherein said motor generator is a variable reluctance type to convert chemical energy from the reaction of the sodium potassium liquid fuel to electric energy, and wherein piston elements reciprocate within a magnetic field to induce electric current which is delivered to said storage battery.

9. A system for operating a vehicle which includes the features of claim 8 above, wherein said power plant is an electrically operated vehicle and said variable reluctance motor generator is carried by said vehicle, and which further includes vehicle drive and control means operated by said storage battery, fuel cell means to generate electricity from the hydrogen formed in the combustion chamber of the motor generator, means connecting said electricity to storage battery, and means joining said fuel cell to the water reservoir to transfer water formed in the fuel cell.

10. A system which includes the features of claim 7 above, which further includes a drive motor and control assembly carried by said vehicle, and wherein said storage battery operates the vehicle drive motor with its stored energy at ordinary demands and wherein said motor generating means and fuel cell means deliver energy to charge said battery during greater vehicle operating demands.

11. A method for operating a heat motor with sodium and potassium liquid fuel and water including the steps of
   conveying said sodium and potassium fuel to a combustion chamber associated with a motor having a movable element,
   conveying water to the combustion chamber of said heat motor to obtain heat of reaction and hydrogen,
   expanding a fluid within said reaction chamber with said obtained heat of reaction to impart movement to said movable element,
   removing the formed hydrogen to a location other than said combustion chamber to utilize the energy content of said hydrogen,
   transferring formed alkali hydroxides from said motor to a collection zone,
   removing said spent alkali hydroxides from said collection zone, and conveying a new charge of fuel and water to said combustion chamber of said motor.

12. A method which includes the steps of claim 11 above, which further includes reacting said removed hydrogen with oxygen to develop energy.

13. A method which includes the steps of claim 12 above and which further includes obtaining said new charge of fuel and water by applying a primary electrical power source to regenerate said alkali hydroxide by electrolysis to sodium potassium fuel and water, and using said primary electric power source to operate a battery charger which, in turn, charges said storage battery.

14. A method which includes the steps of claim 11 above and which further includes the steps of converting mechanical energy in said motor to obtain electrical energy, charging a storage battery with said electrical energy, and transferring energy from said storage battery to a vehicular drive motor to obtain an operating electrical vehicle.

15. A method which includes the steps of claim 14 above, which further includes the steps of conveying the hydrogen gas formed in said reaction chamber to a fuel cell environment carried by said vehicle, said fuel cell environment including hydrogen and oxygen electrodes, delivering compressed air from said vehicle to said fuel cell means to develop electric current and conveying said electric current to said storage battery to charge said storage battery for operating said drive motor of the vehicle.

16. An electrically powered vehicle which includes, in combination,
   drive motor and control means,
   a storage battery to electrically operate said drive motor and control means.
   a motor generator having a combustion chamber,
   a fuel tank,
   a supply of sodium potassium liquid fuel in said fuel tank,
   means to deliver said sodium potassium liquid fuel to the combustion chamber of said motor generator,
   a water tank, means to deliver said water to the combustion chamber so that the heat of reaction operates said motor generator,
   means to develop electrical energy in said operating motor generator, and
   means to deliver said electrical energy to said storage battery.

17. A vehicle which includes the elements of claim 16 above, and which further includes a fuel cell, means to route the hydrogen formed in the combustion zone of the motor generator to said fuel cell, means to deliver compressed air to said fuel cell so that the hydrogen and oxygen combine to form electrical energy and water, and means to join said electrical energy to said storage battery.

18. A vehicle which includes the features of claim 17 above, and which further includes a battery charger, said battery charger adapted to receive an electric power input from a source separate from the vehicle, and means to convey electric current from said battery charger to said storage battery.

19. A vehicle which includes the features of claim 18 above and which further includes a collector for spent alkali hydroxides, means to transfer the spent alkali hydroxides from the motor generator to said collector, and means to remove said spent alkali hydroxides from the collector on the vehicle to regenerating means separate from said vehicle.

20. A vehicle which includes the features of claim 19 above, wherein said motor generator is of the variable reluctance type wherein a magnetic element ajoins a movable permeable piston element, means to convert the resulting magnetic energy into electrical energy, and means to deliver said electrical energy to said storage battery.

21. A vehicle which includes the features of claim 20 above, wherein a pair of piston elements are reciprocable within an elongated cylinder, said magnet element adjoining said cylinder, a combustion chamber intermediate the reciprocating piston elements, an air cushion chamber between the end of each cylinder and the reciprocating element, and a plurality of air gaps in the reciprocating piston elements to obtain a plurality of magnetic field reversals for each stroke of the reciprocating piston elements.

22. A vehicle which includes the features of claim 21 above, which further includes a direct current coil associated with said magnet element to form an electromagnetic assembly, a power source for said direct current coil, an armature coil associated with said magnet element to convert magnetic energy into electrical energy, and means to convey the electric current from said armature coil to said storage battery.

23. A vehicle and recycleable sodium-potassium liquid fuel system, including
   a vehicle having a power plant, a sodium-potassium reservoir, a water reservoir and compressed air means, a spent sodium-potassium hydroxide collector on said vehicle, means to convey the water and sodium-potassium from the reservoirs to the power plant, means to convey compressed air to said power plant, and means to transfer the spent sodium-potassium hydroxide formed from the reaction of the power plant to said collector,
   a service facility remote from the vehicle, including a regenerator to convert spent sodium-potassium hydroxide to sodium-potassium fuel, an energy source to operate said regenerator,
   connectible removing means between the service facility and the vehicle so that the spent sodium-potassium hydroxide may be received for treatment in the regenerator, and
   connectible return means between the service facility and the vehicle so that regenerated sodium-potassium fuel may be returned to the vehicle.

* * * * *